Patented July 10, 1951

2,560,043

UNITED STATES PATENT OFFICE 2,560,043

METHOD OF REINFORCING RUBBERLIKE MATERIALS

Ernst Schmidt, Cuyahoga Falls, Ohio, assignor to The Firestone Tire & Rubber Company, Akron, Ohio, a corporation of Ohio No Drawing. Application June 26, 1947, Serial No. 757,340

5 Claims. (Cl. 260—41.5)

This invention relates to a method of reenforcing synthetic rubber by use of colloidal silicious material in combination with a dispersion of the synthetic rubber.

Heretofore, various efforts have been made to compound reenforcing or compounding ingredients with rubber or rubber-like materials when such materials are in a dispersed conditions. Numerous efforts along this line have been made to reenforce or compound natural rubber latex by mixing various compounding and/or reenforcing ingredients in colloidal form therewith, with such resulting mixture being thereafter coagulated and the rubber so obtained being processed in any desired manner. The unvulcanized compounded mixtures so obtained have met varying degrees of acceptance in the rubber trade and have been of varying qualities depending upon the specific method of compounding the rubber dispersion and/or its processing after being mixed with the compounding ingredients, as the physical type of processing of the solid elastomer mixture affects the ultimate properties of the end product.

In attempting to compound or process dispersions of synthetic rubber or rubber-like materials in accordance with the teachings of the prior art, varying results have been obtained, depending upon the properties desired and materials used. Such compounding or processing has been with use of the same ingredients as used when compounding or processing natural rubber latex and, by such processing, it has been especially difficult to reinforce a latex of a synthetic rubber called GR–S (a rubbery copolymer of butadiene and styrene) so that its physical properties will be as strong as might be expected from corresponding experience with natural rubber.

The general object of this invention is to avoid and overcome the foregoing difficulties and to provide a novel method of mixing a reinforcing agent with GR–S when it is in dispersed condition.

Another object of the invention is to produce a reinforcing agent for rubbery copolymers of butadiene and styrene in situ in a dispersion of such a copolymer.

Another object of the invention is to provide an inexpensive but effective reinforcing agent which can easily be incorporated in dispersions of rubbery copolymers of butadiene and styrene.

Another object of the invention is to reinforce GR–S rubber with silica.

Another object of the invention is to provide an acid-silicate mixture which will condense and automatically gel and can be used to carry along a synthetic rubber dispersion therewith.

A further object of the invention is to provide an inexpensive, rapid method of reinforcing a rubber-like material obtained from a dispersion.

The foregoing and other objects and advantages of the invention will be made apparent as the specification proceeds.

In accordance with the teachings of this invention, a water solution of sodium silicate is prepared and is mixed with a sufficient quantity of acidic material, such as hydrochloric acid, sulphuric acid, sodium acid sulfate, etc., so as to form a substantially neutral mixture. Preferably hydrochloric acid is used since it appears to give slightly more desirable properties in the resultant products and the quantity of acid added usually is sufficient to leave the resulting mixture slightly alkaline, which facilitates its gelling. In all events, addition of the silicate solution to the acid functions to produce silicic acid and a salt, such as sodium chloride (when waterglass and hydrochloric acid are used). The silicic acid when originally formed is monomeric but it will automatically and substantially instantaneously start to condense and eventually function to create a silica gel. Possibly the presence of the sodium chloride or other salt, which is formed simultaneously with the silicic acid, in the acid-silica mixture acts to effect a gelation of the mixture with the speed of such gelling action being determined by the pH of the mixture. Usually the mixture is made slightly alkaline, as such a mixture sets up quite rapidly, whereas an acid mixture gels more slowly.

As a primary feature of the invention, the acid-silica mixture is separately prepared and as soon as the sodium silicate solution is added to the acidic material to start the condensation of the monomeric silicic acid, the resulting mixture is added to or has added to it, ordinarily within a few seconds, the GR–S latex which is to be reenforced. Due to the rapid addition of the latex to the acid-silica mixture, some of the silicic acid in the mixture is still condensing as it is in monomeric silicic or low molecular weight polysilicic acid form. By such immediate addition of the GR–S dispersion to the acid-silica mixture and agitating them together, a homogeneous mixture results which gels so as to solidify and form a uniform gel from the mixture and, suprisingly, the silica gel entrains the GR–S particles with it in its original highly dispersed form as the acid-silicic mixture gels to form a brittle, non-rubbery solid having the particles of the latex uniformly distributed therethrough. Such rubbery particles are of colloidal size as are the particles of $SiO_2$ present whereby an intimate mixture of such materials is effected.

The gel produced is permitted to stand or "rest" for one or two hours to permit it to harden, after which it is broken up into relatively small particles, such as one or two inches in maximum dimension. The gel particles are partially dried in any conventional manner, after which the particles are placed on a standard rubber wash mill to wash out the sodium chloride or other salt produced in the reaction between the silicate and the acid and leave only the GR-S containing finely divided silica which is sheeted off the mill. The washed and dried GR-S now may have other compounding ingredients mixed with it, be shaped to the desired form, and vulcanized in accordance with conventional practice.

From practice of the invention, it has been found, furthermore, that the physical properties of the reenforced synthetic rubber obtained, especially modulus and rate of cure, can be controlled or influenced by adjustment of the pH value of the waterglass and acid mixture. Increasing the pH value in turn increases the modulus and the rate of cure.

As a specific example of practice of the invention, it has been found that excellent results are obtained when about 30.65 lbs. of 3% hydrochloric acid are mixed with about 37.1 lbs. of waterglass containing 7.96% of $SiO_2$, and about 23.4 lbs. of GR-S latex containing 28% solids. About 11.95 lbs. of water was also added to the waterglass-acid mixture. As in the disclosure given hereinbefore, the waterglass and acid are mixed to form a slightly alkaline product, having had, in this example, a pH of 7.57, which was mixed with the GR-S latex immediately, and the resulting intimate mixture of silica and GR-S rubber latex, which had a pH of 7.8, rapidly gelled. As long as the mixture of the waterglass and acid is kept slightly alkaline, no special stabilizer ordinarily need be added to the GR-S latex, which usually has a pH of about 9, to prevent it from coagulating when mixed with the acid-waterglass mixture. In the example given above, the GR-S latex had been standing for some time and its pH had fallen so that 50 milliliters of a 10% NaOH solution were added to restore its pH to 9.1. Normally it is preferred to have the mixture of GR-S latex and the silica-acid mix gel in about two to three minutes and with the proportions given above, such action is achieved. In commercial practice, even more dilute solutions of the various ingredients may be used so that a slower gelling action is effected.

The reenforcing action achieved by practice of the invention is illustrated by the following chart which shows a comparison of the tensile strength of vulcanized, unreenforced GR-S rubber as compared with the same material having comparable amounts of carbon black and silica included therein. The materials were, of course, processed in a similar manner so that a fair comparison can be made between the different GR-S stocks, although the silica was added to GR-S latex and the carbon black was milled into the dried GR-S. Silica ws also milled into GR-S rubber as a further check of the present invention.

| Reinforcing Material | 18 Volumes $SiO_2$ per 100 Volumes GR-S, according to this invention | 20 Volumes of E. P. C. carbon black per 100 Volumes GR-S Milled in | 20 Volumes of Fumed Silica Pigment per 100 volumes of GR-S Milled in | None |
|---|---|---|---|---|
| *Property* | | | | |
| Elongation (percent) | 320 | 330 | 540 | 400 |
| 300% Modulus (p. s. i.) | 2,725 | 2,175 | 475 | 200 |
| Tensile (p. s. i.) | 2,900 | 2,500 | 1,850 | 420 |

The following compounding ingredients were included in each of the above compositions in addition to the reenforcing material:

Parts by weight: 2.4 sulfur; 1.8 mercaptobenzothiazole; 3.0 zinc oxide; 2.0 stearic acid; .5 phenyl-beta naphthylamine; and 100.0 GR-S rubber.

The carbon black used in the above test was Spheron No. 9, which is an easy processing reinforcing channel black. The fumed silica used was prepared by burning diethyl silicate.

In practice of the invention, other soluble silicates than waterglass may be used, for example, ortho- or meta-silicate. The addition of the synthetic rubber latex to the acid-silica mix must be made in the period of time that such mix remains fluid, which may be as long as several hours for an acid or dilute mixture, and at least several minutes for an alkaline mix. Immediate addition of the latex, in accordance with the invention, is considered to fall within the above limits. However, the acid-silica mix normally gels in a short time, such as thirty to sixty seconds. The specific materials used, the temperatures, and the concentrations all influence the rate of gellation and variation of such factors occasions the wide variation in gelling time indicated above.

One conventional latex stabilizer which has been used with the latex before mixing it with the acid-silica mix in practice of the invention contained the sodium salt of technical lauryl sulfate.

In accordance with this invention, the term "latex" is taken to mean an aqueous dispersion of an elastomer. It has been established that particularly effective results have been achieved with GR-S rubber which includes all rubbery copolymers of a conjugated diene such as 1,3-butadiene, isoprene and 2-cyano-1,3-butadiene with a vinylbenzene such as styrene, methylstyrenes, chlorostyrenes, and dichlorostyrenes.

It has been established that synthetic rubber materials produced in accordance with the invention have excellent physical properties and that silica functions as a low-cost, high grade reinforcing agent, which produces a substantially transparent product. The silica can be used in any desired quantity, in accordance with conventional reinforcing action. Milling the synthetic rubber-silica mixture improves the physical properties of the substance appreciably but the excellent reinforcing action obtained appears due to gelling the silica gel in intimate mixture with the synthetic rubber dispersion. Due to the low cost of the starting materials, the invention provides a method of obtaining a high grade reinforced rubber at low cost and by an easily practiced process so that the objects of the invention are achieved.

One complete embodiment of the invention has been described herein in detail, but it will be understood that the invention is not limited to the specific example set forth since modification may be resorted to within the scope of the appended claims.

What is claimed is:

1. That method of reenforcing synthetic rubber comprising the steps of preparing an aqueous solution of sodium silicate, mixing the sodium silicate solution with acid to form a mixture having a pH of from 7 to about 7.57 of monomeric silicic acid and a sodium salt with the monomeric acid condensing rapidly, immediately mixing an aqueous dispersion of a rubbery copolymer of butadiene and styrene with the above mixture which still contains low molecular weight polysilicic acid that is in the process of condensing, letting the resulting mixture gel and stand for several hours, breaking up the brittle, non-rubbery gelled mixture into particles of material, partially drying the particles of material and milling and compounding the material so obtained.

2. That method of reenforcing synthetic rubber comprising the steps of preparing an aqueous solution of sodium silicate, mixing the sodium silicate solution with an acidic material to form a mixture having a pH of from 7 to about 7.57 of silicic acid and a salt with the silicic acid condensing rapidly, immediately mixing a butadiene-styrene copolymer latex with the acid-silica mixture, letting the resulting mixture gel, breaking up the gelled mixture, partially drying the particles of the mixture, washing the particles, milling the residual material, and compounding the milled material so obtained.

3. That method of reinforcing synthetic rubber comprising the steps of preparing an aqueous solution of sodium silicate, mixing about 37.1 parts of the sodium silicate solution containing about 8% of $SiO_2$ with about 30.6 parts of 3% hydrochloric acid to form a slightly alkaline mixture of silicic acid and a salt with the acid condensing rapidly to form a high molecular weight polysilicic acid, immediately mixing about 23.4 parts of a butadiene-styrene copolymer latex containing 28% solids with the above mixture, letting the mixture gel and stand for some time, breaking up the gelled mixture into particles, partially drying the particles of the mixture, washing the particles to remove the sodium salt produced in the reaction of the silicate and acid, and milling the material so obtained.

4. A method of reenforcing a rubbery copolymer of a conjugated diene and a vinyl benzene comprising the steps of preparing an aqueous solution of a sodium silicate, mixing the silicate solution with an acidic material to form a mixture having a pH from 7 to about 7.57 of silicic acid and a salt with the silicic acid condensing rapidly to form high molecular weight polysilicic acid therefrom, immediately mixing a latex of said rubbery copolymer with the above mixture which automatically and rapidly gels, partially drying the gel, and milling the gel to produce an elastomer composition substantially reenforced by finely divided silica dispersed therethrough.

5. A reenforced rubbery copolymer of a conjugated diene and a vinyl benzene produced in accordance with the method of claim 4.

ERNST SCHMIDT.

REFERENCES CITED

The following references are of record in the file of this patent:

UNITED STATES PATENTS

| Number | Name | Date |
|---|---|---|
| 2,302,833 | Behrman | Nov. 24, 1942 |

FOREIGN PATENTS

| Number | Country | Date |
|---|---|---|
| 298,628 | Great Britain | Oct. 14, 1927 |